United States Patent
Lee et al.

(10) Patent No.: US 10,749,160 B2
(45) Date of Patent: Aug. 18, 2020

(54) ELECTRODE ASSEMBLY AND METHOD FOR MANUFACTURING THE SAME

(71) Applicant: LG CHEM, LTD., Seoul (KR)

(72) Inventors: Sang Kyun Lee, Daejeon (KR); Cha Hun Ku, Daejeon (KR); Jung Kwan Pyo, Daejeon (KR); Ju Hyeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 190 days.

(21) Appl. No.: 15/737,964

(22) PCT Filed: Jan. 12, 2017

(86) PCT No.: PCT/KR2017/000398
§ 371 (c)(1),
(2) Date: Dec. 19, 2017

(87) PCT Pub. No.: WO2017/142206
PCT Pub. Date: Aug. 24, 2017

(65) Prior Publication Data
US 2018/0323415 A1 Nov. 8, 2018

(30) Foreign Application Priority Data
Feb. 16, 2016 (KR) .................. 10-2016-0018002

(51) Int. Cl.
*H01M 2/16* (2006.01)
*H01M 2/14* (2006.01)
(Continued)

(52) U.S. Cl.
CPC ......... *H01M 2/1673* (2013.01); *H01M 2/145* (2013.01); *H01M 2/266* (2013.01); *H01M 10/04* (2013.01)

(58) Field of Classification Search
CPC .... H01M 10/04; H01M 2/145; H01M 2/1673; H01M 2/266
See application file for complete search history.

(56) References Cited

U.S. PATENT DOCUMENTS 10,115,950 B2 * 10/2018 Lee .................... H01M 2/1646
2006/0051647 A1 * 3/2006 Tachibana ............ B01D 67/009
521/27
(Continued)

FOREIGN PATENT DOCUMENTS

EP    2 894 694 A1    7/2015
JP    10-172531 A     6/1998
(Continued)

OTHER PUBLICATIONS

Office Action corresponding to Japanese Patent Application No. 2018-512162, dated Apr. 8, 2019, 12 pages.
(Continued)

*Primary Examiner* — Adam A Arciero
(74) *Attorney, Agent, or Firm* — Birch, Stewart, Kolasch & Birch, LLP

(57) ABSTRACT

The present invention relates to an electrode assembly. The electrode assembly comprises: a first separator sheet; and a first electrode sheet and a second electrode sheet, which respectively adhere to both surfaces of the first separator sheet, wherein patterned masks having different adhesion force are respectivley disposed on both the surfaces of the first separator sheet, and the first electrode sheet adheres to the mask of a first surface of both the surfaces, which has relatively high adhesion force, and the second electrode sheet adheres to the mask of a second surface having relatively low adhesion force.

16 Claims, 9 Drawing Sheets

(51) Int. Cl.
*H01M 2/26* (2006.01)
*H01M 10/04* (2006.01)

(56) References Cited

U.S. PATENT DOCUMENTS

| | | | | |
|---|---|---|---|---|
| 2009/0325057 A1* | 12/2009 | Kim | .................. | H01M 2/14 429/131 |
| 2011/0003210 A1 | 1/2011 | Lim et al. | | |
| 2011/0206962 A1 | 8/2011 | Minami et al. | | |
| 2015/0228951 A1* | 8/2015 | Yu | .................. | H01M 2/145 429/144 |
| 2015/0263324 A1* | 9/2015 | Lee | .................. | H01M 2/1646 429/145 |
| 2018/0159104 A1* | 6/2018 | Lee | .................. | H01M 2/145 |

FOREIGN PATENT DOCUMENTS

| | | | |
|---|---|---|---|
| JP | 2002015773 | A | 1/2002 |
| JP | 2011012238 | A | 1/2011 |
| JP | 2013157121 | A | 8/2013 |
| KR | 10-2001-0039510 | A | 5/2001 |
| KR | 10-0958649 | B1 | 5/2010 |
| KR | 10-2014-0065053 | A | 5/2014 |
| KR | 10-1457546 | B1 | 11/2014 |
| KR | 10-2015-0037643 | A | 4/2015 |
| KR | 10-2015-0051901 | A | 5/2015 |

OTHER PUBLICATIONS

International Search Report for PCT/KR2017/000398 (PCT/ISA/210) dated Apr. 21, 2017.
European Search Report for Appl. No. 17753367.6 dated Jun. 1, 2018.

\* cited by examiner

ELECTRODE ASSEMBLY AND METHOD FOR MANUFACTURING THE SAME

CROSS-REFERENCE TO RELATED APPLICATION

The present application claims the benefit of the priority of Korean Patent Application No. 10-2016-0018002, filed on Feb. 16, 2016, which is hereby incorporated by reference in its entirety.

TECHNICAL FIELD

The present invention relates to an electrode assembly and a method for manufacturing the same, and more particularly, an electrode assembly, which is improved in adhesion between an electrode and a separator and wetting property and facilitates gas removal, and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

Such a secondary battery according to the related art comprises an electrode assembly. Here, a positive electrode and a negative electrode are respectively disposed on top and bottom surfaces of a separator and then laminated by using a pressure and folded to manufacture the electrode assembly.

However, in the electrode assembly, the positive electrode has adhesion force greater than that of the negative electrode. Thus, if the positive electrode and the negative electrode adhere to the separator under the same condition, a deviation in adhesion force of the positive electrode and the negative electrode may occur. As a result, it is difficult to manufacture electrode assemblies having uniform quality.

DISCLOSURE OF THE INVENTION

Technical Problem

The present invention has been made to solve the above-mentioned problem, and an object of the present invention is to provide an electrode assembly, in which an adhesion layer on each of top and bottom surfaces of a separator is patterned so that a positive electrode and a negative electrode adhere with the same adhesion force, a wetting property is improved, and a gas is easily discharged, and a method for manufacturing the same.

Technical Solution

To achieve the above-described object, an electrode assembly according to the present invention comprises: a first separator sheet; and a first electrode sheet and a second electrode sheet, which respectively adhere to both surfaces of the first separator sheet, wherein patterned masks having different adhesion force are respectivley disposed on both the surfaces of the first separator sheet, and the first electrode sheet adheres to the mask of a first surface of both the surfaces, which has relatively high adhesion force, and the second electrode sheet adheres to the mask of a second surface having relatively low adhesion force.

Each of both the surfaces of the first separator sheet may be plasma-treated to provide the mask having a predetermined pattern and activated adhesion force, and the second surface may be relatively weakly plasma-treated when compared to the first surface.

Only the first surface of the first separator sheet may be plasma-treated to provide the mask having a predetermined pattern and activated adhesion force.

A surface except for the mask on both the surfaces or the first surface of the first separator sheet may have no adhesion force or adhesion force less than that of the mask.

A binder coating layer, on which a mask having a predetermined pattern is disposed, may be disposed on each of both surfaces of the first separator sheet, wherein the second surface may be provided with the binder coating layer on which the mask having a surface area and thickness less than those of the mask disposed on the first surface is disposed.

A binder coating layer, on which a mask having a predetermined pattern is disposed, may be disposed on each of both surfaces of the first separator sheet, wherein the second surface may be provided with the binder coating layer disposed on the second surface the mask disposed on the second surface may have a surface area and thickness less than those of the mask of the first surface.

The mask that is activated in adhesion force with the predetermined pattern by the plasma treatment may protrude from the binder coating layer.

The second surface may be relatively weakly plasma-treated when compared to the first surface.

A surface of the plasma-treated binder coating layer except for the mask may have no adhesion force or adhesion force less than that of the mask.

The first electrode sheet may be a negative electrode, and the second electrode sheet may be a positive electrode.

The electrode assembly may further comprise a second separator sheet adhering to one outer surface of the first electrode sheet or the second electrode sheet.

A surface of the second separator sheet, which adheres to the first electrode sheet or the second electrode sheet, may be plasma-treated to provide a mask having a predetermined pattern and activated adhesion force.

When the second separator sheet adheres to an outer surface of the second electrode sheet, the mask disposed on the second separator sheet and the mask disposed on the second surface of the first separator sheet may have the same adhesion force.

When the second separator sheet adheres to an outer surface of the first electrode sheet, the mask disposed on the second separator sheet and the mask disposed on the first surface of the first separator sheet may have the same adhesion force.

A method for manufacturing the electrode assembly comprising above-described constituents according to the present invention comprises: a step (S10) of manufacturing a first separator sheet so that patterned masks having different adhesion force are formed on both surfaces of the first separator sheet; a step (S20) of disposing a first electrode sheet on a mask of a first surface of both the surfaces of the first separator sheet, which has relatively high adhesion force and disposing a second electrode sheet on a mask of a second surface of both the surfaces of the first separator sheet, which has relatively low adhesion force; and a step (S30) of applying heat and a pressure to allow the first electrode sheet and the second electrode sheet to adhere to both the surfaces of the first separator sheet and thereby to manufacture a radial unit.

In the step (S10), each of both the surfaces of the first separator sheet may be plasma-treated to provide the mask having a predetermined pattern and activated adhesion force, and the second surface may be relatively weakly plasma-treated when compared to the first surface.

In the step (S10), only the first surface may be plasma-treated to provide the mask having a predetermined pattern and activated adhesion force.

In the step (S10), a binder coating layer, from which a mask having a predetermined pattern protrudes, may be disposed on each of both surfaces of the first separator sheet, wherein the mask disposed on the second surface may have a surface area and thickness less than those of the mask disposed on the first surface.

After the step (S30), the method may further comprise a step (S40) of applying heat and a pressure to allow a second separator sheet to adhere to the second electrode sheet of the radical unit and winding the radical unit to manufacture the electrode assembly.

Advantageous Effects

The present invention has effects as follows.

First: the patterned mask to which the adhesion force on both the surfaces of the first separator sheet is differently applied may be provided to uniformly adjust the adhesion force of the first electrode sheet and the second electrode sheet, and particularly, the gas may be discharged, or the electrolyte may be introduced through the space between the patterned mask to improve the impregnation, thereby improving the quality of the electrode assembly.

Second: the patterned mask, in which the plasma applied to the first and second surfaces of the first separator sheet varies in intensity to differently apply the adhesion force to both the surfaces of the first separator sheet, may be provided.

Third: the plasma may be applied to only the first surface of the first separator sheet to activate the patterned mask and thereby to differently apply the adhesion force to both the surfaces of the first separator sheet.

Fourth: the patterned masks having different surface areas and thicknesses may be applied to the binder coating layer applied to both the surfaces of the first separator sheet to apply the different adhesion force to both the surfaces of the first separator sheet.

MODE FOR CARRYING OUT THE INVENTION

Figure 1:
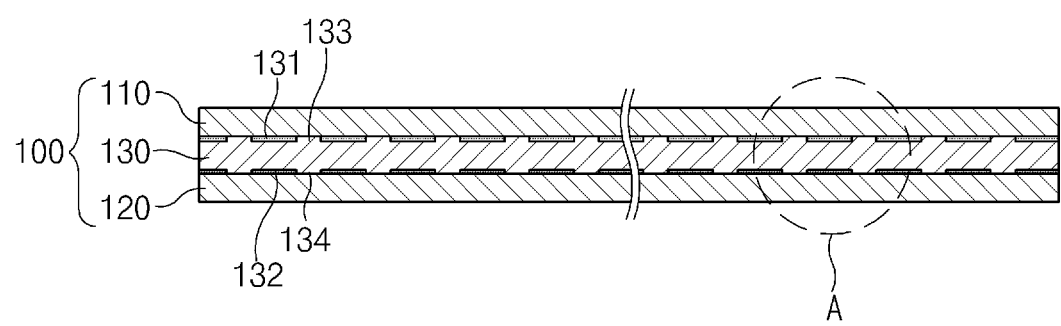
FIG. 1 is a cross-sectional view of an electrode assembly according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly]

As illustrated in FIG. 1, an electrode assembly 100 according to the present invention comprises a first separator sheet 130 and first and second electrode sheets 110 and 120 respectively adhering to both surfaces, i.e., top and bottom surfaces of the first separator sheet 130 when viewed in FIG. 1. Here, the first electrode sheet 110 is a negative electrode, and the second electrode sheet 120 is a positive electrode.

In the electrode assembly 100, the second separator sheet 112 that is the positive electrode has adhesion force greater than that of the first electrode sheet 110 that is the negative electrode. Thus, when the first and second electrode sheets 110 and 120 respectively adhere to both the surfaces of the first separator sheet 130 with the same adhesion force, since the adhesion force of the second electrode sheet 120 is excessively greater than that of the first electrode sheet 110, factors that hinder interfacial adhesion may occur.

Particularly, when the electrode assembly 100 adheres, a gas may be generated between the first separator sheet 130 and the first electrode sheet 110 and between the first separator sheet 130 and the second electrode sheet 120. Thus, the gas is not discharged to the outside to cause factors that hinder the adhesion of the electrode assembly 100.

Figure 2:
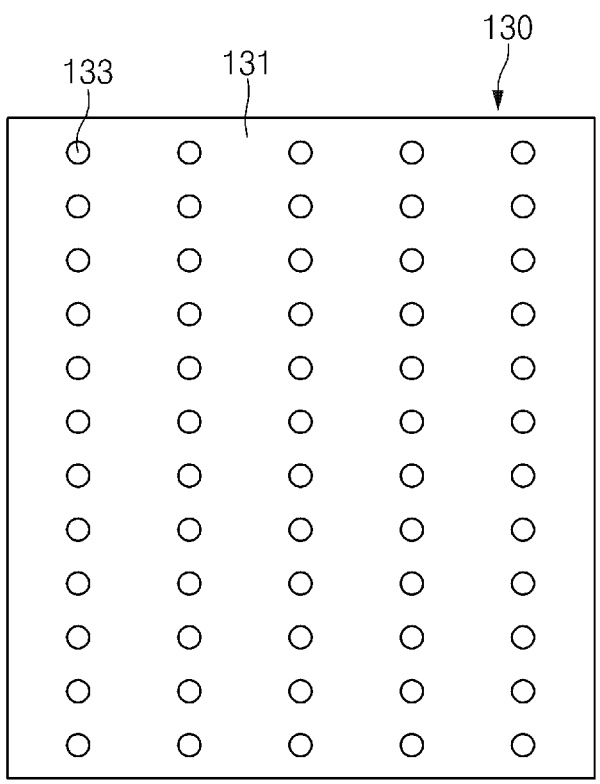
FIG. 2 is a plan view illustrating a first surface of a first separator sheet provided in the electrode assembly according to the present invention.
Figure 3:
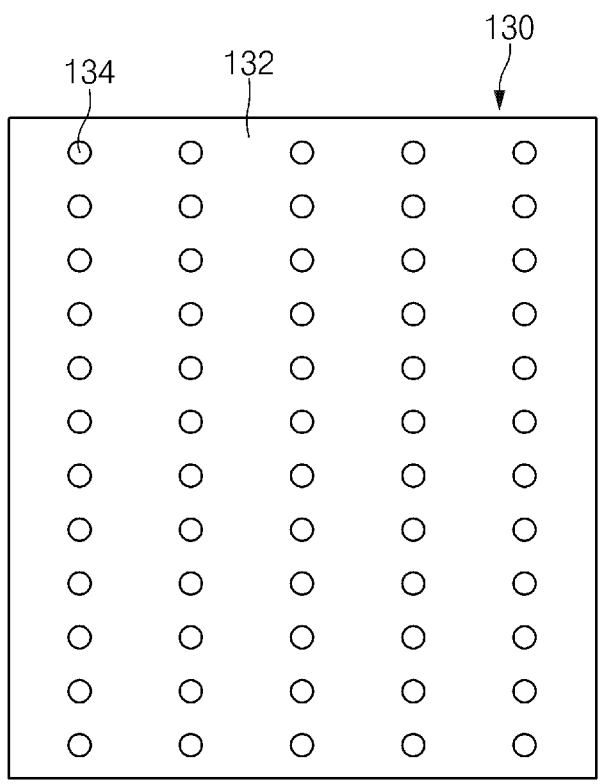
FIG. 3 is a plan view illustrating a second surface of the first separator sheet provided in the electrode assembly according to the present invention.

To solve the above-described problem, as illustrated in FIGS. 2 and 3, the electrode assembly 100 according to the present invention may uniformly adjust the adhesion force of the first electrode sheet 110 and the second electrode sheet 120 through the first separator sheet 130 having a patterned mask with different adhesion force on both surfaces thereof. Particularly, a gas generated when the electrode assembly adheres may be quickly discharged to the outside through a path between the patterned mask, and also, an electrolyte may be introduced to improve impregnation.

Figure 4:
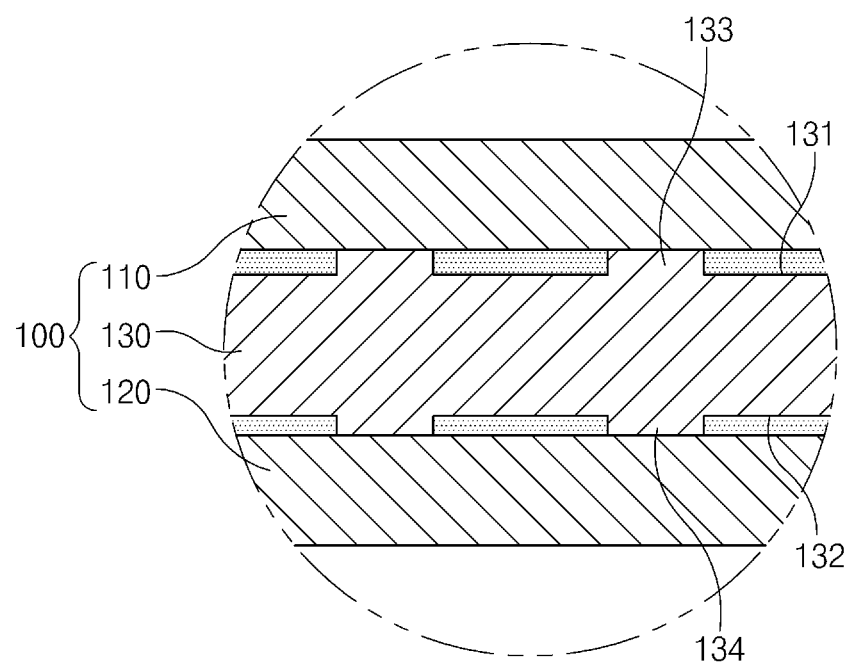
FIG. 4 is an enlarged view of a portion 'A' illustrated in FIG. 1.

That is, in the electrode assembly 100 according to the present invention, as illustrated in FIG. 4, patterned masks 133 and 134 having different adhesion force may be respectively provided on both surfaces of the first separator sheet 130. The first electrode sheet 110 adheres to the mask 133 of the first surface 131 of both the surfaces, which has relatively high adhesion force, and the second electrode sheet 120 adheres to the mask 134 of the second surface 132 having relatively low adhesion force.

That is, the patterned masks 133 and 134 having the adhesion force may be respectively provided on both the surfaces of the first separator sheet 130. Here, the mask 134 disposed on the second surface 132 of the first separator sheet 130 to which the second electrode sheet 120 adheres may be reduced in adhesion force to uniformly adjust the adhesion force of the first electrode sheet 110 and the second electrode sheet 120.

Particularly, the masks 133 and 134 disposed on both the surfaces of the first separator sheet 130 may be formed with a predetermined pattern to provide a path between the masks 133 and 134 in a longitudinal direction or a width direction. Thus, the gas generated when the electrode assembly 100 adheres may be discharged, or the electrolyte may be introduced through the path to improve the impregnation.

Hereinafter, the electrode assembly 100 according to embodiments of the present invention will be described with reference to the accompanying drawing.

First Embodiment

Figure 8:
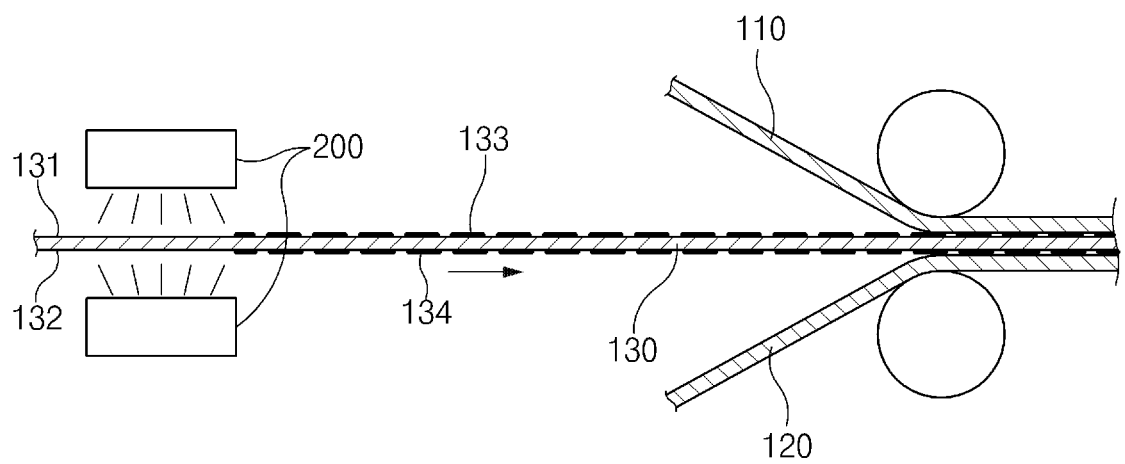
FIG. 8 is a view illustrating a process of manufacturing the first separator sheet according to the first embodiment of the present invention.

According to a first embodiment, referring to FIGS. 1 and 8, a first separator sheet 130 of an electrode assembly 100 has both surfaces on which masks 133 and 134 having adhesion force with a predetermined pattern by plasma treatment of a plasma device 200 are provided. Here, relatively weak plasma treatment may be performed on the second surface 132 when compared to the first surface 131. Thus, the patterned mask 132 of the second surface 132 may have adhesion force less than that of the patterned mask 134 of the first surface 131.

As described above, since the second electrode sheet 120 adheres to the mask 134 of the second surface 132 that is relatively weakly plasma-treated, and the first electrode sheet 110 adheres to the mask 133 of the first surface 131 that is relatively strongly plasma-treated, the first and second electrode sheets 110 and 120 may have uniform adhesion force.

Here, the masks 133 and 134 may protrude with a predetermined pattern from both surfaces of the first separator sheet 130. Thus, a gas discharge space may be defined between the masks 133 and 134 to more easily discharge the gas generated when the electrode assembly 100 adheres.

Here, each of the masks 133 and 134 may have one of a circular shape, an oval shape, a rectangular shape, a polygonal shape, and a long bar shape.

Particularly, the surface in which the gas discharge space, in which the masks 133 and 134 are not provided, is defined may have no adhesion force or adhesion force less than those of the masks 133 and 134 to realize the adhesion and gas discharge performance at the same time.

Figure 7:
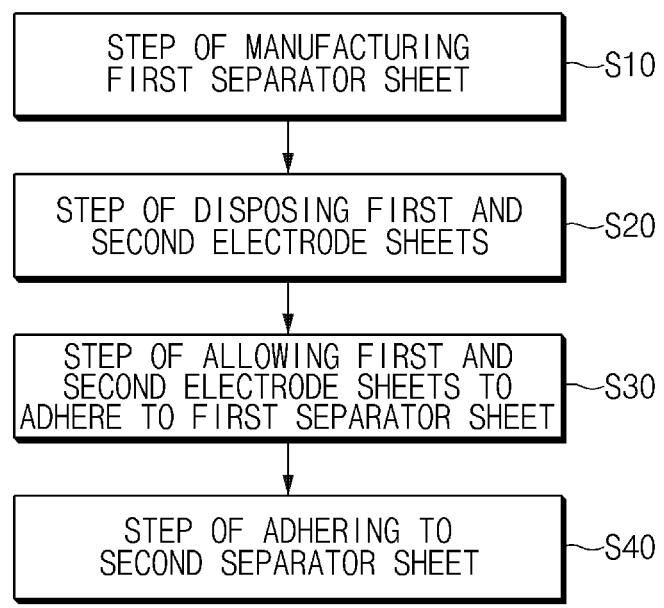
FIG. 7 is a flowchart illustrating a method for manufacturing an electrode assembly according to the present invention.

Here, as illustrated in FIG. 7, the electrode assembly 100 according to the present invention further comprises a second separator sheet 140 adhering to one outer surface of the first or second electrode sheet 110 or 120.

Figure 6:
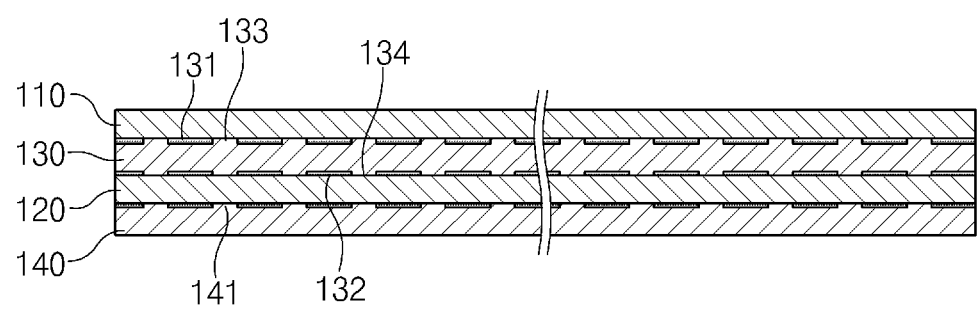
FIG. 6 is a cross-sectional view of the electrode assembly comprising a second separator sheet according to the first embodiment of the present invention.

That is, the electrode assembly 100 has to comprise the second separator sheet 140 on the outermost portion thereof so that the electrode assembly 100 is wound to be manufactured in a jelly-roll shape. As illustrated in FIG. 6, the second separator sheet 140 adheres to a lower portion of the second electrode sheet 120, and thus, the electrode assembly 100 has a structure in which the first electrode sheet 110, the first separator sheet 130, the second electrode sheet 120, and the second separator sheet 140 are laminated and wound. As a result, the electrode assembly 100 is manufactured in the jelly-roll shape.

The surface of the second separator sheet 140, which adheres to the first or second electrode sheet 110 or 120, may be plasma-treated to provide a mask 141 having a predetermined pattern and activated adhesion force, thereby improving the adhesion force of the electrode sheet adhering to the second separator sheet 140.

Here, when the second separator sheet 140 adheres to an outer surface of the second electrode sheet 120, the mask 141 of the second separator sheet 140 and the mask 134 disposed on the second surface 132 of the first separator sheet 130 may have the same adhesion force, and thus, both surface of the second electrode sheet 120 may have the same adhesion force.

Also, when the second separator sheet 140 adheres to an outer surface of the first electrode sheet 110, the mask 141 of the second separator sheet 140 and the mask 133 disposed on the first surface 131 of the first separator sheet 130 may have the same adhesion force, and thus, both surface of the first electrode sheet 110 may have the same adhesion force.

Second Embodiment

Figure 5:
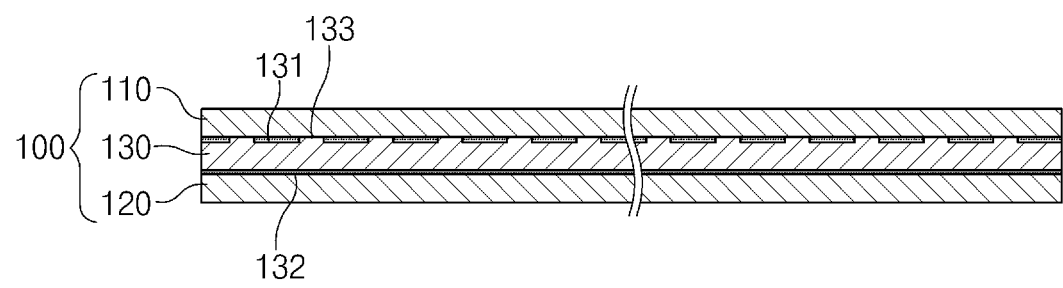
FIG. 5 is a cross-sectional view of an electrode assembly according to a second embodiment of the present invention.
Figure 9:
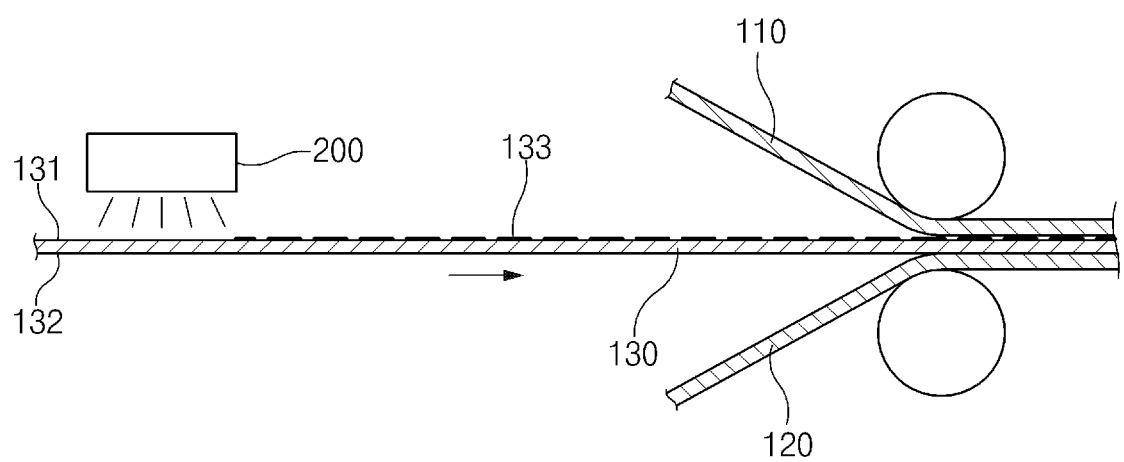
FIG. 9 is a view illustrating a process of manufacturing a first separator sheet according to the second embodiment of the present invention.

According to a second embodiment, referring to FIGS. 5 and 9, in an electrode assembly 100, only a first surface 131 is plasma-treated to provide a mask 133 having a predetermined pattern and activated adhesion force. That is, since the first surface 131 is plasma-treated to have adhesion force greater than that of the second surface 132, the first and second electrode sheets 110 and 120 may be uniformly adjusted in adhesion force.

[Method for Manufacturing Electrode Assembly]

A method for manufacturing the electrode assembly comprising the above-described constituents will be described below.

As illustrated in FIG. 7, a method for manufacturing the electrode assembly according to the present invention comprises a step (S10) of manufacturing a first separator sheet 130 so that patterned masks 133 and 134 having different adhesion force are formed on both surfaces of the first separator sheet 130, a step (S20) of disposing a first electrode sheet 110 and a second electrode sheet 120 on both the surfaces of the first separator sheet 130, and a step (S30) of allowing the first electrode sheet 110 and the second electrode sheet 120 to respectively adhere to the masks 133 and 134 formed on both the surfaces of the first separator sheet 130. The unfinished electrode assembly is wound in a jelly-roll shape to manufacture a finished electrode assembly 100.

In the step (S10), the patterned masks 133 and 134 having different adhesion force are formed on both the surfaces of the first separator sheet 130.

According to a first method, as illustrated in FIG. 8, both the surfaces of the first separator sheet 130 are plasma-treated through a plasma device 200 to form the masks 133 and 134, each of which has a predetermined pattern and activated adhesion force. Here, the second surface 132 is more weakly plasma-treated when compared to the first surface 131, and thus, the mask 134 of the second surface 132 has adhesion force less than that of the mask 133 of the first surface 131.

That is, the mask 133 of the first surface 131 having relatively high adhesion force may adhere to the first electrode sheet 110 having relatively low adhesion force, which is a negative electrode, and the mask 134 of the second surface 132 having relatively low adhesion force may adhere to the second electrode sheet 120 having relatively high adhesion force, which is a positive electrode. Thus, the first electrode sheet 110 and the second electrode sheet 120 may be uniformly adjusted in adhesion force. Particularly, a gas generated when the electrode assembly adheres may be discharged through a space between the patterned masks 133 and 134 to prevent adhesion defects due to the gas from occurring.

According to a second method, as illustrated in FIG. 9, only the first surface 131 of both the surfaces of the first separator sheet 130 may be selectively plasma-treated through the plasma device 200 to form the mask 133 having a predetermined pattern and activated adhesion force, and thus, the second surface 132 may have adhesion force less than that of the first surface 131. As a result, the first electrode sheet 110 and the second electrode sheet 120 may be uniformly adjusted in adhesion force.

In the step (S20), the first electrode sheet 110 is disposed on the first surface 131, which has relatively high adhesion force, of both the surfaces of the first separator sheet 130, and the second electrode sheet 120 is disposed on the second surface 132, which has relatively low adhesion force, of both the surfaces of the first separator sheet 130.

In the step (S30), heat and a pressure are applied to allow the first electrode sheet 110 and the second electrode sheet 120 to adhere to both surfaces of the first separator sheet 130 and thereby to manufacture a unfinished electrode assembly.

After the step (S30), the method comprises a step (S40) of allowing a second separator sheet 140 to adhere to the outermost portion of the unfinished electrode assembly.

As illustrated in FIG. 6, in the step (S40), heat and a pressure are applied to allow the second separator sheet 140 to adhere to the second electrode sheet 120 of the unfinished electrode assembly, and then, the second separator sheet 140 and the second electrode sheet 120 are wound in a jelly-roll shape to manufacture an electrode assembly. Here, the mask 141 of the second separator sheet 140 may have the same adhesion force as the mask 134 disposed on the second surface 132 of the first separator sheet 130.

Thus, in the electrode assembly according to the present invention, the first electrode sheet 110 and the second electrode sheet 120 may respectively adhere to both the surfaces of the separator, which have different adhesion force, to uniformly adjust the adhesion force of the first and second electrode sheets 110 and 120, thereby improving quality.

Accordingly, the scope of the present invention is defined by the appended claims rather than the foregoing description and the exemplary embodiments described therein.

Various modifications made within the meaning of an equivalent of the claims of the invention and within the claims are to be regarded to be in the scope of the present invention.

The invention claimed is:

1. An electrode assembly comprising:
  a first separator sheet; and
  a first electrode sheet and a second electrode sheet, which respectively adhere to opposite surfaces of the first separator sheet,
  wherein a first mask is disposed on a first surface of the first separator sheet, the first mask having a first adhesion force,
  wherein a second mask is disposed on a second surface of the first separator sheet, the second mask having a second adhesion force,
  wherein the first surface of the first separator sheet is plasma-treated to cause the first adhesion force to be greater than the second adhesion force,
  wherein the first electrode sheet adheres to the first mask of the first surface and the second electrode sheet adheres to the second mask of the second surface,
  wherein a gas discharge space is defined between the first mask and the second mask,
  wherein the gas discharge space includes a surface having a third adhesion force, and wherein the third adhesion force is less than the first adhesion force and the second adhesion force.

2. The electrode assembly of claim 1, wherein both the first surface and the second surface of the first separator sheet is plasma-treated to provide the first mask and the second mask, each having a predetermined pattern and activated adhesion force, and the second surface is more weakly plasma-treated than the first surface.

3. The electrode assembly of claim 1, wherein only the first surface of the first separator sheet is plasma-treated to provide the first mask having a predetermined pattern and activated adhesion force.

4. The electrode assembly of claim 2, wherein a surface except for the first mask of the first surface and the second mask of the second surface of the first separator sheet has no adhesion force or an adhesion force less than the first adhesion force or the second adhesion force.

5. The electrode assembly of claim 1, wherein the first electrode sheet is a negative electrode, and the second electrode sheet is a positive electrode.

6. The electrode assembly of claim 1, further comprising a second separator sheet adhering to one outer surface of the first electrode sheet or the second electrode sheet.

7. The electrode assembly of claim 6, wherein a surface of the second separator sheet, which adheres to the first electrode sheet or the second electrode sheet, is plasma-treated to provide a mask having a predetermined pattern and activated adhesion force.

8. The electrode assembly of claim 7, wherein, when the second separator sheet adheres to an outer surface of the second electrode sheet, the mask disposed on the second separator sheet and the second mask disposed on the second surface of the first separator sheet have the same adhesion force.

9. The electrode assembly of claim 7, wherein, when the second separator sheet adheres to an outer surface of the first electrode sheet, the mask disposed on the second separator sheet and the first mask disposed on the first surface of the first separator sheet have the same adhesion force.

10. The electrode assembly of claim 3, wherein a surface except for the first mask on the first surface of the first separator sheet has no adhesion force or an adhesion force less than the first adhesion force.

11. The electrode assembly of claim 1, wherein the first mask and the second mask protrude with a predetermined pattern from the first surface and the second surface, respectively, of the first separator sheet.

12. A method for manufacturing an electrode assembly, the method comprising:
  a step (S10) of manufacturing a first separator sheet so that patterned masks having different adhesion force are formed on opposite surfaces of the first separator sheet;
  a step (S20) of disposing a first electrode sheet on a first mask of a first surface of the first separator sheet, which has a first adhesion force and disposing a second electrode sheet on a second mask of a second surface of the first separator sheet, which has a second adhesion force;
  a step of plasma-treating the first surface of the first separator sheet to cause the first adhesion force to be greater than the second adhesion force; and
  a step (S30) of applying heat and a pressure to allow the first electrode sheet and the second electrode sheet to adhere to both the first surface and the second surface of the first separator sheet and thereby to manufacture a radial unit, wherein a gas discharge space is defined between the first mask and the second mask, and wherein the gas discharge space includes a surface having a third adhesion force, and wherein the third adhesion force is less than the first adhesion force and the second adhesion force.

13. The method of claim 12, wherein, in the step (S10), both the first surface and the second surface of the first separator sheet is plasma-treated to provide the first mask and the second mask, each having a predetermined pattern and activated adhesion force, and the second surface is more weakly plasma-treated than the first surface.

14. The method of claim 12, wherein, in the step (S10), only the first surface is plasma-treated to provide the first mask having a predetermined pattern and activated adhesion force.

15. The method of claim 12, after the step (S30), further comprising a step (S40) of applying heat and a pressure to allow a second separator sheet to adhere to the second electrode sheet of the radical unit and winding the radical unit to manufacture the electrode assembly.

16. The method of claim 12, wherein the first mask and the second mask protrude with a predetermined pattern from the first surface and the second surface, respectively, of the first separator sheet.

\* \* \* \* \*